Oct. 7, 1930. S. WAGNER Re. 17,822

BORING MACHINE

Original Filed May 25, 1926

INVENTOR.
STEFAN WAGNER.

BY

ATTORNEY.

Reissued Oct. 7, 1930

Re. 17,822

UNITED STATES PATENT OFFICE

STEFAN WAGNER, OF LOS ANGELES, CALIFORNIA

BORING MACHINE

Original No. 1,693,971, dated December 4, 1928, Serial No. 111,484, filed May 25, 1926. Application for reissue filed May 29, 1930. Serial No. 457,458.

This invention relates to boring machines.

The general object of the invention is to provide an improved multiple spindle boring machine.

A specific object of the invention is to provide an improved head for use with boring machines.

Another object of the invention is to provide a novel mechanism for shifting the head of a boring machine.

A further object of the invention is to provide a head having a plurality of chucks thereon and having novel means for moving and holding the chucks.

Other objects of the invention will be apparent from the following description taken in connection with the accompanying drawings, wherein.

Figure 1:
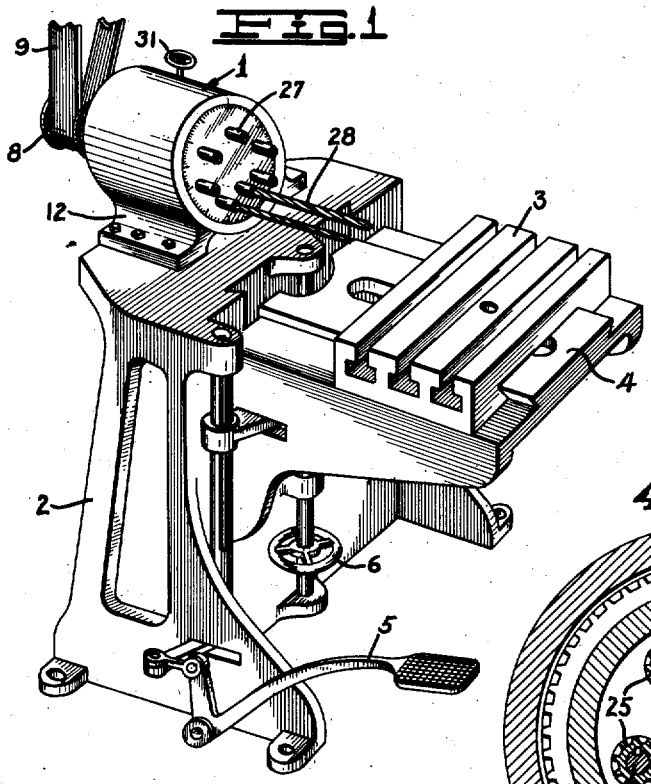
Fig. 1 is a perspective view of a boring machine embodying the feature of my invention.
Figure 2:
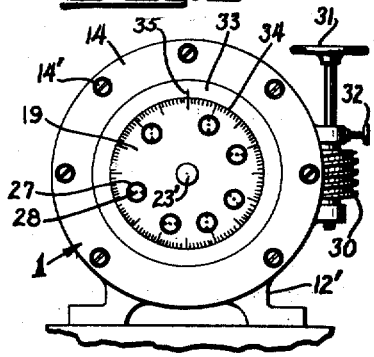
Fig. 2 is a front view of the spindle head.
Figure 3:
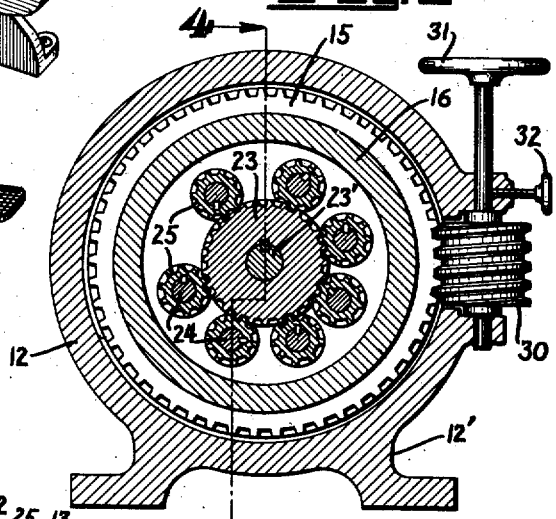
Fig. 3 is a transverse section through the head.
Figure 4:
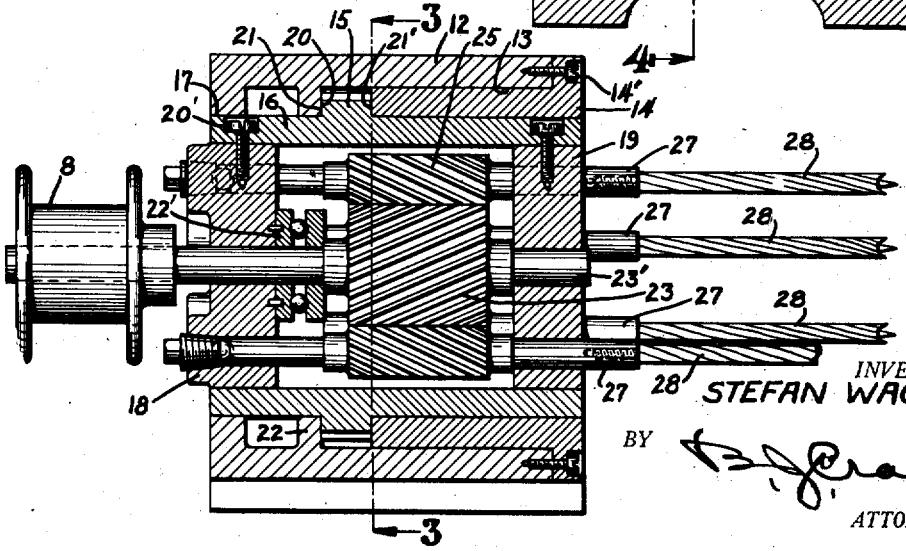
Fig. 4 is a longitudinal section taken on line 4—4, Fig. 3.

Referring to the drawing by reference characters I have shown my improved boring machine as comprising a head 1 mounted on a base 2 which has a work holding slide 3 thereon. The slide moves on a bed 4 being moved toward and from the head 1 by a foot pedal 5. The bed 4 is moved vertically by means of a hand wheel 6. The boring head 1 is illustrated as having a pulley 8 and a belt 9 for supplying the rotating power to the tool spindles or chucks in which drills are mounted. It is to be understood however, that any suitable means of power application may be employed such as a direct motor drive or a gear drive without affecting the scope of the invention.

The boring head 1 consists of a supporting casing 12 having a supporting base 12′ and provided with a central bore 13 for the reception of a flanged bushing 14 which is shown as secured to the front face of the supporting casing 12 by means of fastening members 14′.

The bushing serves to hold a gear 15, which is mounted on a cylindrical sleeve 16, in place. The housing is bored out as at 17 to form an end bearing for the sleeve 16 previously described. The face 20 of the gear abuts against the face 21 of an internal flange 22 formed at the juncture of bores 13 and 17. The front face 21′ of the gear 15 engages the rear face of the bushing 14 thus preventing undue lateral movement of the gear 15.

At the front and rear of the sleeve 16 I arrange internal collars 18 and 19 which are held in place by fastening members 20′.

Mounted within the collars 18 and 19 is a shaft 23′ upon which the pulley 8 is mounted. This shaft 23′ is provided with suitable thrust bearings 22′ which take the thrust from a spiral gear 23 arranged thereon. Mounted on spindles 24 arranged about the shaft 23′, I fix spiral gears 25. These gears mesh with the main gear 23 and are driven thereby. The spindles 24 are mounted in the collars 18 and 19 and the construction is such that when the pulley 8 is driven the gear 23 will drive the gears 25.

The spindles 24 have chucks 27 mounted thereon. These chucks are adapted to receive drills or bits 28 which are adapted to operate upon work held upon the slide 3.

In order to rotate the gear 15 and thus bodily rotate all of the chucks, I provide a worm 30 which coacts with the worm gear 15 so that when a hand wheel 31 is turned the gear 15 will be rotated to thus rotate the chucks. A locking member 32 may be employed to hold the worm 30 in set position.

The spindles 24 are irregularly spaced around the shaft 23′. By thus asymmetrically spacing the spindles, the head may be adjusted for boring a pair of holes or a group of holes in a piece of work in certain desired relations to each other. While thus adjusted, the operation may be repeated on another piece of work with the assurance that both pairs of holes or both groups of holes will be exact duplicates of each other.

The head is provided with a front face 33 while the outer face of the collar 19 is provided with a scale 34 which cooperates with an index 35 to indicate the circumferential disposition of the chucks.

From the foregoing description it will be apparent that I have provided an improved boring machine which can be economically manufactured and which is highly efficient in use.

Having thus described my invention, I claim:

1. A boring machine comprising a casing, a sleeve journaled in said casing, a centrally disposed shaft journaled in said sleeve, provided with a gear, a plurality of irregularly spaced spindles journaled in said sleeve surrounding said centrally disposed shaft provided with gears meshing with the gear on said centrally disposed shaft, worm teeth on the periphery of said sleeve, a worm journaled in said casing adapted to engage with said worm teeth, and means for rotating said worm.

2. A boring machine comprising a casing, a sleeve journaled in said casing, a centrally disposed shaft mounted in said sleeve, gear means on said shaft, a pluality of spindles arranged at irregular intervals around said shaft, gear means carried by each of said spindles adapted to mesh with the gear means on said shaft, means for rotatably adjusting said sleeve in said casing and means for securing said sleeve in its adjusted position.

3. A boring machine comprising a casing, a sleeve journaled in said casing, a shaft mounted in said sleeve, a plurality of spindles arranged at irregular intervals around said shaft, interengaging means carried by said shaft and each of said spindles whereby rotation of the shaft causes rotation of the spindles and means for rotatably adjusting said sleeve and said shaft in said casing.

4. A boring machine comprising a support, a sleeve mounted on said support, a central shaft carried in said sleeve, a plurality of spindles arranged at irregular intervals around said central shaft, gear means on said shaft, gear means on each of said spindles intermeshing with the gear means on said shaft and means on said support and said sleeve for angularly adjusting said sleeve with respect to said support.

5. A boring machine comprising a supporting casing, an internal abutment on said casing, a sleeve mounted on said supporting casing and having a portion bearing against said abutment, a central shaft rotatably mounted in said sleeve, a plurality of spindles asymmetrically disposed around said shaft, gear means on said shaft, gear means on each of said spindles meshing with the gear means on said shaft, and cooperating means on said casing and said sleeve for rotatably adjusting said sleeve with respect to said supporting casing.

6. A boring machine comprising a support, an abutment on said support, a sleeve rotatably mounted on said support and having a portion bearing against said abutment, a central shaft mounted to rotate in said sleeve, a plurality of spindles asymmetrically disposed at intervals around said shaft, coacting means on said shaft and on each of said spindles to cause said spindles to be driven by said shaft, and means for holding said sleeve in adjusted position with respect to said support.

7. A boring machine comprising a support, a sleeve journaled in said support, a centrally disposed shaft in said sleeve, spaced bearings for said shaft, gear teeth on said shaft, a plurality of irregularly spaced spindles journaled in said sleeve surrounding said centrally disposed shaft, said spindles having gearing teeth meshing with the gear teeth on said centrally disposed shaft, worm teeth on the periphery of said sleeve and means to hold said sleeve in adjusted position relative to said support.

In testimony whereof, I hereunto affix my signature.

STEFAN WAGNER.